United States Patent
Yi et al.

(10) Patent No.: US 9,809,691 B2
(45) Date of Patent: Nov. 7, 2017

(54) POLYOLEFIN COMPOSITE COMPOSITION FOR AUTOMOTIVE AIRDUCT

(71) Applicants: Hyundai Motor Company, Seoul (KR); Lotte Chemical Corporation, Seoul (KR); Kia Motors Corporation, Seoul (KR)

(72) Inventors: Seul Yi, Seoul (KR); Boo Youn An, Seoul (KR); Dae Sik Kim, Gyeonggi-do (KR); Kyeong Hoon Jang, Seoul (KR); In Soo Han, Gyeonggi-do (KR); You Jin Park, Gyeonggi-do (KR); Byung Kook Nam, Daejeon (KR); Hyeung Shin Lee, Daejeon (KR); Hyun Jin Kim, Daejeon (KR)

(73) Assignees: Hyundai Motor Company, Seoul (KR); Lotte Chemical Corporation, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 15/284,782

(22) Filed: Oct. 4, 2016

(65) Prior Publication Data
US 2017/0267826 A1  Sep. 21, 2017

(51) Int. Cl.
| | |
|---|---|
| C08L 23/06 | (2006.01) |
| C08L 23/12 | (2006.01) |
| B60H 1/26 | (2006.01) |
| C08J 9/00 | (2006.01) |
| B60H 1/00 | (2006.01) |

(52) U.S. Cl.
CPC ........ *C08J 9/0061* (2013.01); *B60H 1/00564* (2013.01); *C08J 9/0066* (2013.01); *C08L 23/06* (2013.01); *C08J 2323/06* (2013.01); *C08J 2423/12* (2013.01); *C08L 2205/02* (2013.01); *C08L 2207/062* (2013.01)

(58) Field of Classification Search
CPC . C08L 23/06; C08L 2205/02; B60H 1/00564; C08J 9/0066; C08J 2423/12
See application file for complete search history.

(56) References Cited

U.S. PATENT DOCUMENTS

| | | | |
|---|---|---|---|
| 2011/0056584 A1* | 3/2011 | Onodera | B60H 1/00564 138/177 |
| 2013/0129950 A1* | 5/2013 | Hersche | C08L 23/06 428/35.7 |
| 2015/0225527 A1* | 8/2015 | Gossi | C08J 9/103 521/95 |

FOREIGN PATENT DOCUMENTS

| | | | |
|---|---|---|---|
| JP | 2006083283 A | * | 3/2006 |
| JP | 2007509206 A | | 4/2007 |
| JP | 2013136681 A | | 7/2013 |
| KR | 10-2005-0047543 A | | 5/2005 |
| KR | 10-2007-0028736 A | | 3/2007 |
| KR | 10-2014-0059255 A | | 5/2014 |
| KR | 10-2015-0079726 A | | 7/2015 |
| KR | 10-2015-0143199 A | | 12/2015 |

OTHER PUBLICATIONS

Definition authored by Clive Maier and Theresa Calafut, Entitled "Polypropylene: The Definitive User's Guide and Databook," Dated Apr. 15, 1998, p. 69, Definition taken from Plastics Design Library under Section 8—Foams.

* cited by examiner

*Primary Examiner* — Kara Boyle
(74) *Attorney, Agent, or Firm* — Brinks Gilson & Lione

(57) ABSTRACT

A polyolefin composite composition is used in an automotive air duct. The polyolefin composite composition is useful as an automotive air duct component material due to excellent mechanical property, heat resistance, and foaming property as a composition in which a polyethylene resin and a long chain branched polypropylene resin having low crystallization of 45% or less are included as a base resin.

7 Claims, 1 Drawing Sheet

POLYOLEFIN COMPOSITE COMPOSITION FOR AUTOMOTIVE AIRDUCT

CROSS-REFERENCE TO RELATED APPLICATION

Figure 1A:
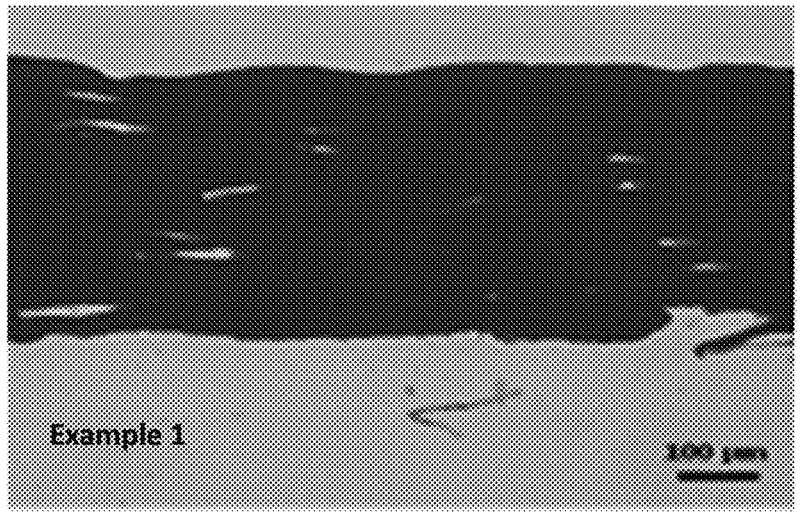

This application claims under 35 U.S.C. §119(a) the benefit of and priority to Korean Patent Application No. 10-2016-0032291 filed on Mar. 17, 2016, the entire content of which is incorporated herein by reference.

FIELD

The present disclosure relates to a polyolefin composite composition used in an automotive air duct. More particularly, it relates to a polyolefin composite composition which is useful as an automotive air duct component material.

BACKGROUND

The statements in this section merely provide background information related to the present disclosure and may not constitute prior art.

An air conditioning system mounted on an automobile has a function of providing a pleasant environment to a passenger in the automobile even in a change of weather or driving conditions. In the air conditioning system of the automobile, blown air moves along an air duct which is a transfer path of the air and is blown into the automobile through an air vent which is connected to one end of the air duct.

The air duct for the automotive air conditioning system is generally manufactured by blow-molding the polyethylene resin. However, a solid type air duct manufactured by molding polyethylene has become an impediment to reduction in weight of the automobile due to the large density.

In the solid type air duct, a condensation phenomenon of moisture is generated due to poor insulation and cooling and heating efficiency of the automobile is reduced, and thus, emission quantity of carbon dioxide is increased and fuel efficiency of the automobile is reduced. As a result, non-woven fabric is attached to an outer part of the solid type air duct to reduce noise while improving insulation. However, a problem in the weight is still present and there is a limitation of adding a manufacturing process.

In order to solve the problem, research in which a foaming body which is foamed with a foaming agent to be light and has excellent insulation for application to the air duct has been continued. However, the foaming air duct may not obtain desired strength due to limitation of a kind of resin configuring the foaming body, and thus, it is difficult to manufacture an air duct having good mechanical properties and there is a limitation that the surface quality of the finally-produced air duct is bad.

In Korea Patent Publication No. 10-2015-0143199, a molded article foamed by including a polyethylene resin having a crystallization temperature of 112 to 150° C., a low density polyethylene resin, an inorganic filler, and an olefin-based polymer is described. A polypropylene resin having a crystallization temperature of 112 to 150° C. measured by a differential scanning calorimeter (DSC) is included in a base to minimize a phenomenon in which foaming cells are exploded on the surface when manufacturing the molded article through rapid surface elevation. However, we have discovered that since deterioration of properties may occur due to compatibility between the polypropylene resin and the inorganic filler, there is a disadvantage in that an olefin-based polymer as a compatibilizer needs to be included as a required component.

SUMMARY

The present disclosure provides a polyolefin composite composition with excellent mechanical property, heat resistance, and foaming property without adding a compatibilizer. A molded article for an automotive air duct which is foam-molded with the polyolefin composite composition is also provided.

In one aspect, the present disclosure provides a polyolefin composite composition, comprising: a polyethylene resin of 65 to 94.5 wt. %; a long chain branched polypropylene resin of 5 to 30 wt. % with crystallization of 20 to 45%; and an inorganic filler of 0.5 to 5 wt. % based on the overall weight of the polyolefin composite composition.

In another aspect, the present disclosure provides polyolefin composite prepared by mixing and extruding the composition.

In still another aspect, the present disclosure provides a molded article for an automotive air duct prepared by molding the polyolefin composite.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Further areas of applicability will become apparent from the disclosure provided herein. It should be understood that the description and specific examples are intended for purposes of illustration only and are not intended to limit the scope of the present disclosure.

DRAWINGS

The above and other features of the present disclosure will now be described in detail with reference to several embodiments thereof illustrated in the accompanying drawings which are given herein below by way of illustration only, and thus are not limitative of the present disclosure, and wherein:

FIGS. 1 A and B are optical micrographs of foam specimens prepared in (A) Example 1 and (B) Comparative Example 1.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

Hereinafter reference will now be made in detail to various embodiments of the present disclosure, examples of which are illustrated in the accompanying drawings and described below. While the invention will be described in conjunction with several embodiments, it will be understood that present description is not intended to limit the disclosure to those embodiments. On the contrary, the disclosure is intended to cover not only the described embodiments, but also various alternatives, modifications, equivalents and other embodiments, which may be included within the spirit and scope of the disclosure as defined by the appended claims.

According to one aspect of the present disclosure, a polyolefin composite composition, a polyolefin composite prepared by extruding the composition, and an air duct article prepared by molding the composite is described. However, this is presented as one example of the present disclosure and the scope of the present disclosure is not limited thereto and it is apparent to those skilled in the art that various transformations of the implementation example can be made within the scope of the present disclosure.

Additionally, unless particularly mentioned throughout the specification, "including" or "containing" designates including any component (alternatively, constituent element) without a particular limit and may not be analyzed as addition of another component (alternatively, constituent element) is excluded.

The present disclosure provides a polyolefin composite composition including a polyethylene resin, a long chain branched polypropylene resin with crystallization of 20 to 45%, and an inorganic filler.

In the case of a foaming composite including the polypropylene resin and the inorganic filler, there are disadvantages in that due to poor foaming properties, the sizes of foaming cells are large and a difference in foaming cell size is severe. In order to solve the disadvantages, a compatibilizer has been included as an essential component. However, the present disclosure provides a composite composition with excellent mechanical properties, heat resistance and improved foaming properties without a separate compatibilizer by including a long chain branched polypropylene (PP) resin with crystallization of 45% or less.

The components of the polyolefin composite composition according to the present disclosure will be described in detail as follows.

(1) Polyethylene resin—In the composite composition of the present disclosure, as the polyethylene resin, at least one selected from a group consisting of high density polyethylene (HDPE), low density polyethylene (LDPE), linear low density polyethylene (LLDPE), and ethylene vinyl acetate (EVA) may be included.

A polyethylene resin having a melt index of 0.5 to 10 g/10 min (230° C. and 2.16 Kgf) is used as the polyethylene resin. When the melt index of the polyethylene resin is less than 0.5 g/10 min (230° C. and 2.16 Kgf), moldability may be reduced. On the contrary, when the melt index is more than 10 g/10 min (230° C. and 2.16 Kgf), there is a problem in thickness uniformity of the air duct.

The polyethylene resin may be included with the content of 65 to 94.5 wt. % in the polyolefin composite composition of the present disclosure. If the content of the polyethylene resin is less than 65 wt. %, there may be a problem in moldability, and if the content is more than 94.5 wt. %, there may be a problem in heat resistance.

(2) Long chain branched polypropylene resin—In the composite composition of the present disclosure, as the polypropylene resin, the long chain branched PP resin with the crystallization of 45% or less, alternatively, the crystallization of 20 to 45% may be used. When the crystallization of the polypropylene resin is 45% or less, an effect of an improved foaming property may be expected, but when the crystallization is more than 45%, the crystallization is high and the foaming property may be reduced.

The long chain branched PP resin has high melt strength during melting because carbons 2 to 100 long chain branches are bonded to the linear polypropylene. A long chain branched PP resin in which chain branches of four per one thousand carbon atoms (4/1,000 C) or more, particularly, 4 to 20/1,000 C are bonded may be used as the long chain branched PP resin. That is, the chain branches are bonded to the polypropylene resin and the melt strength is increased to obtain effects of preventing the cell from being broken in the foaming process and of forming the uniform foam cell. However, when the number of chain branches which are bonded to the linear polypropylene is less than 4/1,000 C, the melt strength is decreased and thus, the uniform foam cell may not be constituted. Further, when the number of chain branches which are bonded to the linear polypropylene is more than 20/1,000 C, the melt strength is excessively high and thus, there is a problem in that processability is reduced.

Since the long chain branched PP resin has a higher melting point than polyethylene, an effect of improving heat resistance of the final molded article may be expected.

The long chain branched PP resin may be included with the content of 5 to 30 wt. % in the polyolefin composite composition of the present disclosure. If the content of the long chain branched PP resin is less than 5 wt. %, there may be a problem in foaming and moldability, and if the content is more than 30 wt. %, there may be a problem in economics and flowability.

(3) Inorganic filler—The inorganic filler is a component used for reinforcing stiffness and improving foaming property and is not particularly limited in selection thereof. The inorganic filler may be, at least one selected from a group consisting of talc, calcium carbonate, calcium sulfate, magnesium oxide, calcium stearate, wollastonite, mica, silica, calcium silicate, clay, whisker, and carbon black. In the use of the inorganic filler, it is believed that an increase in the stiffness and strength of the resin composition is distinct according to an increase in an inorganic filler content. Alternatively, wollastonite or whisker may be used as the inorganic filler.

An average particle size of the inorganic filler included in the composite composition of the present invention is about 0.5 to 10 μm and alternatively, 1 to 4 μm. When the average particle size of the inorganic filler is less than 0.5 μm, there is a problem in productivity of the polyolefin composite. When the average particle size of the inorganic filler is more than 10 μm, the foaming property of the polyolefin composite may be reduced.

The inorganic filler may be included with the content of 0.5 to 5 wt. % in the polyolefin composite composition of the present disclosure. If the content of the inorganic filler is less than 0.5 wt. %, there may be a problem in foaming odd nuclei action, and if the content is more than 5 wt. %, there may be a problem in that the melt strength is reduced.

(4) Additive—The polyolefin composite composition of the present disclosure may include an additive which is generally used in the art, in addition to the polyethylene resin, the long chain branched PP resin, and the inorganic filler. The additive may be, without limitation, at least one selected from a group consisting of antioxidants, UV stabilizers, flame retardants, colorants, plasticizers, thermal stabilizers, slip agents, and antistatic agents.

The usage amount of the additive may be adjusted in an optimal range by considering the entire preparation amount, the preparing process, and the like within a known range which can be used for preparing the polyolefin composite. Nevertheless, if the content of the additive is limited, the additive may be used within a range of 0.01 to 10 parts by weight based on 100 parts by weight of the polyolefin composite composition.

The additive may be additionally added in a mixing process of the polyethylene resin, the long chain branched PP resin, and the inorganic filler, or added by roll mixing milling in a separate adding process.

According to another aspect, the present disclosure provides a polyolefin composite prepared by extruding the polyolefin composite composition. Particularly, after mixing the polyethylene resin, the long chain branched PP resin, and the inorganic filler, the mixture is melt-extruded in a biaxial or more extruder to prepare the polyolefin composite.

The melt-extruding process may be performed at a residence time of 5 to 90 seconds under a condition of a screw rotational speed of 200 to 1000 rpm and alternatively, may be performed at a residence time of 10 to 60 sec under a condition of a screw rotational speed of 300 to 800 rpm. In this case, in order to effectively induce a shear flow and an elongation al flow for mixing and milling the resins and dispersing the inorganic filler in the extruder, it may be desirable that the screw rotational speed is 200 rpm or more, and alternatively, the screw rotational speed is less than 1,000 rpm to prevent deterioration of the polyolefin resin. Further, in order to mix and mil the polyethylene resin, the long chain branched PP resin, and the inorganic filler, the residence time in the extruder may be 5 seconds or more, and in order to prevent deterioration and improve productivity, the residence time may be less than 90 sec.

Further, a temperature of the melt-extruding process may be 160 to 200° C. When the melt-extruding temperature is less than 160° C., it is difficult to melt the composite composition and thus, there is difficulty in production of the composite. When the melt-extruding temperature is more than 200° C., the polyethylene resin and the long chain branched PP resin may be deteriorated.

The polyolefin composite provided in the present disclosure has a flexural modulus of 5,000 $kg/cm^2$ or more, alternatively, 12,000 $kg/cm^2$ or more according to ASTM D790. A tensile strength by ASTM D638 is 100 $kg/cm^2$ or more, alternatively, 200 $kg/cm^2$ or more. A heat deformation temperature by ASTM D648 may be 60° C. or more, and alternatively, 90° C. or more. In the present disclosure, details other than the described contents may be adjusted if necessary and are not particularly limited.

According to another aspect, the present disclosure provides a molded article for an automotive air duct prepared by using the polyolefin composite prepared by the aforementioned method. The air duct as an automotive interior/exterior material may be applied to an air conditioning system of the automobile.

The polyolefin composite may be added with a foaming agent and molded by a generally known molding method to prepare a molded article for the air duct. In the molded article for the air duct, foam cells having an average diameter of 20 to 50 μm are uniformly distributed in the base resin.

The foaming agent refers to a material used for foam-molding the polyolefin resin, and the present disclosure is not particularly limited to selection thereof. However, the foaming agent may be appropriately selected and used by those skilled in the art by considering a chemical foaming agent, a physical foaming agent, and the like according to kinds, characteristics, usages, processing methods, conditions, and the like of the polyethylene resin and the long chain branched PP resin. The foaming agent may include, but not be limited to, azo dicarboxylic amides, N,N'-dinitrosopentamethylene tetraamine, p,p'-oxybis(benzenesulfonyl hydrazide), 5-phenyl tetrazole, p-toluenesulfonyl hydrazide, carbon dioxide, nitrogen gas, sodium bicarbonate, or the like.

The content of the foaming agent may be appropriately selected by those skilled in the art by considering foaming ability and the like of the foaming agent. The foaming agent may be added with 1 to 10 parts by weight and alternatively 2 to 5 parts by weight based on 100 parts by weight of the polyolefin base resin consisting of the polyethylene resin and the long chain branched PP resin. When the adding amount of the foaming agent is less than 1 part by weight, the foaming cells distributed on the polyolefin base are not sufficiently formed and thus, it is difficult to ensure insulation of the final molded article for the polyolefin resin. When the adding amount is more than 10 parts by weight, the foaming cells are excessively formed and thus, the mechanical properties of the molded article may be more reduced.

An example of the molding method may include a blow molding method, and the present invention is not particularly limited to the molding method of the polyolefin composite.

Hereinafter, in order to help understanding of the present invention, the preferable exemplary embodiments are proposed, but the following Examples exemplify the present invention, and the scope of the present invention is not limited to the following Examples.

EXAMPLES

The following examples illustrate the disclosure and are not intended to limit the same.

Examples 1 to 2 and Comparative Examples 1 to 3

A polyethylene resin, a long chain branched polypropylene resin, and talc were mixed with a composition ratio listed in the following Table 1. The mixture was put in a biaxial extruder (a screw diameter of 30 mm and L/D 40) and then blended for 35 sec at a screw rotational speed of 400 rpm while being melted at a temperature of 160 to 200° C. to prepare a polyolefin composite material. Three (3) parts by weight of a foaming agent was additionally mixed based on 100 parts by weight of the polyolefin composite material, and then a specimen was molded by using a foam injection molding machine.

[Composition]
(1) Polyethylene resin.
(1-1) High density polyethylene: Polyethylene resin having a melt index of 2 g/10 min and density of 0.94 $g/cm^3$.
(1-2) Low density polyethylene: Polyethylene resin having a melt index of 5 g/10 min and density of 0.92 $g/cm^3$.
(2) Long chain branched polypropylene resin.
(2-1) Long chain branched polypropylene resin: Polypropylene resin having crystallization of 40% and bonded with chain braches of average ten per one thousand carbon atoms (10/1,000 C).
(2-2) Long chain branched polypropylene resin: Polypropylene resin having crystallization of 53% and bonded with chain braches of average 10/1,000 C.

(3) Inorganic filler.
Talc: Average diameter of 3 μm.

Test Examples

Properties of polyolefin composite foam specimens prepared in Examples 1 and 2 and Comparative Examples 1 to 3 were measured by the following method and the result thereof was listed in the following Table 1.
1) Mechanical properties
Tensile strength (yield): The tensile strength was measured according to ASTM D638.
Flexural modulus: The flexural modulus was measured according to ASTM D790.
IZOD impact strength: The IZOD impact strength was measured at 23° C. according to ASTM D256.
2) Heat resistance
The heat deformation temperature was measured according to ASTM D648.
3) Foaming property
An average diameter of the foaming cell was measured in a range of 1×1 cm by using an optical microscope.

TABLE 1

|  |  | Examples | | Comparative Examples | | |
| --- | --- | --- | --- | --- | --- | --- |
| Classification | | 1 | 2 | 1 | 2 | 3 |
| Composition (wt. %) | High density polyethylene | 79 | 79 | 99 | 79 | 79 |
| | Low density polyethylene | — | 10 | — | 20 | — |
| | Long chain branched polypropylene Crystallization of 40% | 20 | 10 | — | — | — |
| | Long chain branched polypropylene Crystallization of 53% | — | — | — | — | 20 |
| | Talc | 1 | 1 | 1 | 1 | 1 |
| Properties | Tensile strength (Kg/cm$^2$) | 150 | 140 | 135 | 90 | 155 |
| | Flexural modulus (Kg/cm$^2$) | 13,300 | 12,000 | 11,600 | 7,100 | 14,800 |
| | IZOD impact strength (kg/cm) | 33 | 39 | 27 | 22 | 30 |
| | Heat deformation temperature (° C.) | 97 | 95 | 62 | 55 | 99 |
| | Average diameter of foaming cell (mm) | 50 | 35 | 550 | 120 | 350 |

According to Table 1, the specimens of Examples 1 and 2 using the long chain branched polypropylene resin (the crystallization of 40%) had excellent mechanical properties, heat resistance, and foaming property.

On the contrary, it can be seen that the specimens of Comparative Examples 1 and 2 were composite materials without the long chain branched polypropylene resin, and as compared with the specimens of Examples 1 and 2, the mechanical properties were poor, and the heat resistance and the foaming property were very low.

The specimen of Comparative Example 3 was a composite material including the long chain branched polypropylene resin having high crystallization, and as compared with the specimens of Examples 1 and 2, it can be seen that the mechanical properties and the heat resistance were at almost the same level, but the foaming property was low.

Figure 1B:
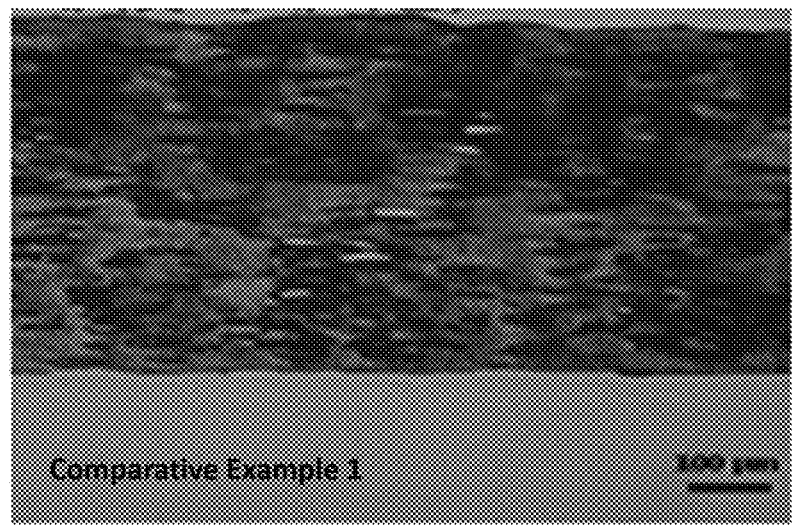

In FIGS. 1(A) and 1(B), an optical micrograph of the foaming specimen of the polyolefin composite prepared according to Example 1 and Comparative Example 1 is shown.

When comparing optical micrographs of FIGS. 1(A) and 1(B), it can be seen that in a specimen (A) of Example 1, cells having small and uniform sizes are formed in the air duct, while in the specimen (B) of Comparative Example 1, cells having nonuniform sizes are formed.

The invention has been described in detail with reference to several embodiments thereof. However, it will be appreciated by those skilled in the art that changes may be made in these embodiments without departing from the principles and spirit of the invention, the scope of which is defined in the appended claims and their equivalents.

What is claimed is:

1. A polyolefin composite composition, comprising:
   a polyethylene resin of 65 to 94.5 wt, %;
   a long chain branched polypropylene resin of 5 to 30 wt. % with crystallization of 20 to 45%; and
   an inorganic filler of 0.5 to 5 wt. %, based on the overall weight of the polyolefin composite composition;
   wherein the long chain branched polypropylene resin has branched chains of 4 to 20/1,000 C in a linear polypropylene.

2. The polyolefin composite composition of claim 1, wherein the polyethylene resin is at least one selected from a group consisting of high density polyethylene (HDPE), low density polyethylene (LDPE), linear low density polyethylene (LLDPE), and ethylene vinyl acetate (EVA).

3. The polyolefin composite composition of claim 1, wherein the polyethylene resin has a melt index of 0.5 to 10 g/10 min (230° C. and 2.16 Kgf).

4. The polyolefin composite composition of claim 1, wherein the inorganic filler has an average particle size of 1 to 4 μm and is at least one selected from a group consisting of talc, calcium carbonate, calcium sulfate, magnesium oxide, calcium stearate, wollastonite, mica, silica, calcium silicate, clay, whisker, and carbon black.

5. The polyolefin composite composition of claim 1, further comprising:
   at least one additive selected from a group consisting of antioxidants, UV stabilizers, flame retardants, colorants, plasticizers, thermal stabilizers, slip agents, and antistatic agents.

6. A polyolefin composite prepared by mixing and melt-extruding the composition of claim 1.

7. A molded article for an automotive air duct prepared through foam-molding by including a foaming agent in the polyolefin composite of claim 6.

* * * * *